US010757208B2

(12) United States Patent
Jalagam et al.

(10) Patent No.: US 10,757,208 B2
(45) Date of Patent: Aug. 25, 2020

(54) CURATING COLLABORATION ACTIVITY

(71) Applicant: Box, Inc., Redwood City, CA (US)

(72) Inventors: Sesh Jalagam, Union City, CA (US); Victor De Vansa Vikramaratne, Sunnyvale, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 16/136,200

(22) Filed: Sep. 19, 2018

(65) Prior Publication Data

US 2020/0076907 A1    Mar. 5, 2020

Related U.S. Application Data

(60) Provisional application No. 62/723,931, filed on Aug. 28, 2018.

(51) Int. Cl.
*H04L 29/08* (2006.01)
*G06F 11/30* (2006.01)
*G06F 11/34* (2006.01)

(52) U.S. Cl.
CPC .......... *H04L 67/22* (2013.01); *G06F 11/3086* (2013.01); *G06F 11/3438* (2013.01); *H04L 67/2804* (2013.01); *H04L 67/306* (2013.01)

(58) Field of Classification Search
CPC ... H04L 67/22; H04L 67/306; H04L 67/2804; G06F 11/3086; G06F 11/3438
See application file for complete search history.

(56) References Cited

U.S. PATENT DOCUMENTS

| 7,669,123 | B2 | 2/2010 | Zuckerberg et al. |
| 8,381,306 | B2 | 2/2013 | Mcpherson et al. |
| 9,805,042 | B1 | 10/2017 | Meyer |
| 9,824,094 | B1 | 11/2017 | Meyer |
| 9,990,365 | B1 | 6/2018 | Kilpatrick |
| 10,074,015 | B1 | 9/2018 | Grundmann |
| 10,102,305 | B1 | 10/2018 | Chang |
| 10,218,784 | B2 | 2/2019 | Ju |

(Continued)

OTHER PUBLICATIONS

Non-Final Office Action dated Nov. 1, 2019 for U.S. Appl. No. 16/136,196.

(Continued)

*Primary Examiner* — Soe Hlaing
(74) *Attorney, Agent, or Firm* — Vista IP Law Group, LLP

(57) ABSTRACT

Systems for curating and presenting relevant collaboration activity to newly-added users in a cloud-based content management platform. A method embodiment commences by observing and recording user events that correspond to interactions between any number of users and any number of content objects. When a new person who does not have an event history is added, his/her user profile is updated to indicate he/she is a new user, and a start-up proxy user is identified. The proxy user refers to either a real user that is in some way similar to the newly-added user, or the proxy user is a virtual user as amalgamated from previously recorded user history records. The events in the history records of the proxy user are associated with the newly-added user. When the newly-added user interacts with a user interface of the cloud-based content management platform, feed entries are generated and presented to the newly-added user.

20 Claims, 12 Drawing Sheets

(56) References Cited

U.S. PATENT DOCUMENTS

| | | |
|---|---|---|
| 10,452,993 B1 | 10/2019 | Hart |
| 2002/0120734 A1 | 8/2002 | Riosa |
| 2004/0054566 A1 | 3/2004 | J'Maev |
| 2005/0010593 A1 | 1/2005 | Fellenstein |
| 2005/0235318 A1 | 10/2005 | Grauch et al. |
| 2006/0161543 A1 | 7/2006 | Feng |
| 2008/0183665 A1 | 7/2008 | Brinker |
| 2008/0195587 A1 | 8/2008 | Hussami |
| 2009/0248615 A1 | 10/2009 | Drory |
| 2012/0192086 A1 | 7/2012 | Ghods |
| 2012/0233096 A1 | 9/2012 | Gupta |
| 2012/0297313 A1 | 11/2012 | Sharma |
| 2013/0179381 A1 | 7/2013 | Kawabata |
| 2013/0179799 A1* | 7/2013 | Savage ............... G06F 3/0482 715/751 |
| 2013/0262598 A1 | 10/2013 | Makanawala |
| 2013/0297689 A1 | 11/2013 | Bhat |
| 2013/0311467 A1 | 11/2013 | Galle et al. |
| 2014/0006977 A1 | 1/2014 | Adams |
| 2014/0081904 A1 | 3/2014 | Sitrick |
| 2014/0327622 A1 | 11/2014 | Ouyang |
| 2015/0134693 A1 | 5/2015 | Chan |
| 2015/0207701 A1 | 7/2015 | Faaborg |
| 2015/0331578 A1 | 11/2015 | Keslin |
| 2017/0139550 A1 | 5/2017 | Milvaney |
| 2017/0168692 A1 | 6/2017 | Chandra |
| 2019/0130031 A1 | 5/2019 | Gourley |

OTHER PUBLICATIONS

Final Office Action dated Mar. 13, 2019 for U.S. Appl. No. 16/136,196.

Activity Stream—Wikipedia, URL:https://en.wikipedia.org/wiki/Activity_stream, Oct. 28, 2019.

Tata, Sandeep, et al. "Quick access: building a smart experience for Google drive." Proceedings of the 23rd ACM SIGKDD International Conference on Knowledge Discovery and Data Mining. ACM, 2017.

Non-Final Office Action dated May 30, 2019 for U.S. Appl. No. 15/728,486.

Final Office Action dated Sep. 30, 2019 for U.S. Appl. No. 15/728,486.

Non-Final Office Action dated Mar. 20, 2020 for U.S. Appl. No. 16/264,357.

* cited by examiner

CURATING COLLABORATION ACTIVITY

CROSS REFERENCE TO RELATED APPLICATION(S)

The present application claims the benefit of priority to U.S. Patent Application Ser. No. 62/723,931 titled "CURATING COLLABORATION ACTIVITY", filed Aug. 28, 2018, which is hereby incorporated by reference in its entirety.

This application is related to U.S. patent application Ser. No. 16/136,196 titled "PRESENTING COLLABORATION ACTIVITIES", filed on Sep. 19, 2018, and U.S. patent application Ser. No. 16/136,207 titled "FILTERING COLLABORATION ACTIVITY", filed on Sep. 19, 2018, which are hereby incorporated by reference in their entirety.

FIELD

This disclosure relates to collaboration systems, and more particularly to techniques for curating collaboration activity.

BACKGROUND

Modern enterprises encourage its employees to actively engage in activities that enhance collaboration. The enterprises can promote such collaboration activities by using a distributed computing and storage platform (e.g., cloud-based content management platform) to efficiently and securely provision content access to various individual users and/or collaborative groups of users. The content management platform facilitates interactions (e.g., authoring, commenting, sharing) by the users over computer-readable content objects (e.g., text files, spreadsheets, mixed text and graphics documents, programming code files, etc.). User activities at the content management platform may also involve explicit user-to-user interactions (e.g., messaging, chatting, object share invitations, etc.) and/or implicit user-to-user relationships (e.g., based on organizational structures).

Organizational collaboration is often enhanced when a particular user can have visibility into the activities of other users. With knowledge of such activities, a user might initiate a new interaction (e.g., with a content object, with another user, etc.) that is beneficial to the efficiency, creativity, and/or productivity of the enterprise.

In many settings, a content management platform may be configured to monitor user activity. Indications of such user activity (e.g., user interactions over content objects and/or user interactions with other users) sometimes take the form of a "feed" that offers visibility into certain aspects of other users' interactions. For example, a feed of a particular user might show that several colleagues (e.g., other users in the same department) have been editing a particular presentation over the past several days.

Unfortunately, in certain situations, determining collaboration activity information to deliver to certain users is deficient. As an example, some approaches might present collaboration activity information to a subject user based on the historical activity (e.g., user-to-user interactions, user-content interactions, etc.) of the user. As such, approaches that rely on historical activity fail when the subject user has little to no historical activity. This can happen, for example, when the subject user is a new employee of an enterprise. In other cases, such low-activity users might not be a new employee, but despite not being a new employee, the user might have a very sparse or nonexistent history of collaborative interactions. What is needed is an improved way of presenting relevant collaboration activity knowledge to users with little or no historical collaborative activity.

SUMMARY

The present disclosure describes techniques used in systems, methods, and in computer program products for curating collaboration activity, which techniques advance the relevant technologies to address technological issues with legacy approaches. More specifically, the present disclosure describes techniques used in systems, methods, and in computer program products for curating collaboration activity feeds from proxy user collaboration activity history. Certain embodiments are directed to technological solutions for curating interaction events from proxy users to generate user-specific collaboration activity feeds for low-activity users.

The disclosed embodiments modify and improve over legacy approaches. In particular, the herein-disclosed techniques provide technical solutions that address the technical problems attendant to presenting relevant collaboration activity knowledge to users with little or no historical collaborative activities. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of human-machine interfaces as well as advances in various technical fields related to machine learning.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
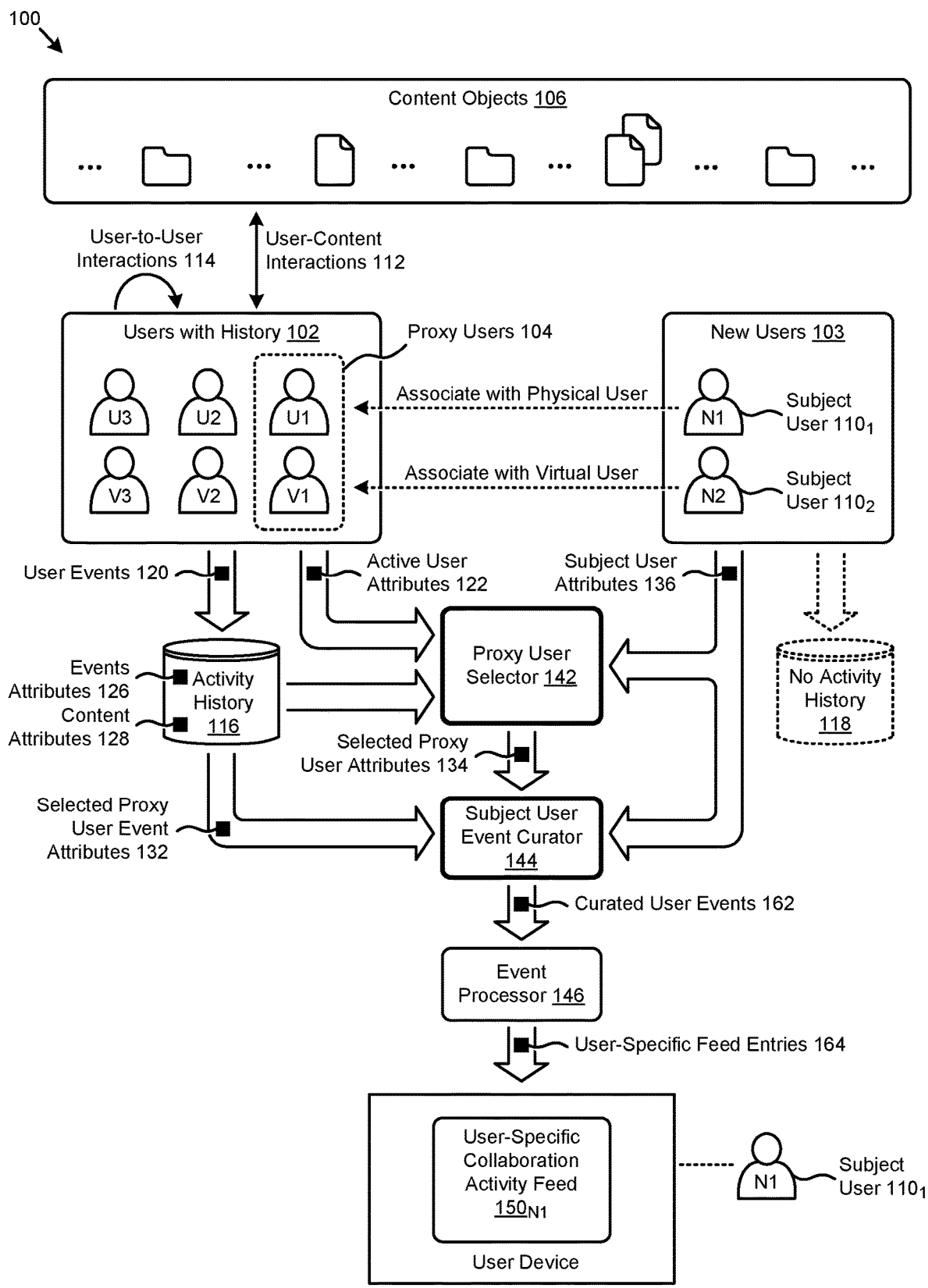
FIG. 1 illustrates a computing environment in which embodiments of the present disclosure can be implemented.

Embodiments in accordance with the present disclosure address the problem of presenting relevant collaboration activity knowledge to users with little or no historical collaborative activities. Some embodiments are directed to approaches for curating interaction events from proxy users to generate user-specific collaboration activity feeds for low-activity users. The accompanying figures and discussions herein present example environments, systems, methods, and computer program products for curating collaboration activity feeds from proxy user collaboration activity history.

Overview

Disclosed herein are techniques for curating user interaction events from proxy users to generate user-specific collaboration activity feeds for low-activity users. In certain embodiments, such techniques are implemented in a content management system that facilitates user-to-user interactions and user-content interactions over a plurality of users and a plurality of content objects. The content management system tracks the activity history of the users by recording the event attributes corresponding to the user's interaction events. For a highly active user, the activity history of the user is accessed to generate a user-specific collaboration activity feed for the user. For a subject user with little or no historical activity (e.g., a new user), the herein disclosed techniques can be used to generate a user-specific collaboration activity feed for the subject user.

A proxy user selected from the plurality of users is associated with the subject user. The proxy user is selected based at least in part on the user attributes of the subject user. The activity history of the proxy user is accessed to curate various user events that are relevant to the subject user. A set of user-specific feed entries are generated from the event attributes of the curated user events. The user-specific feed entries are processed for presentation to the subject user in a user-specific collaboration activity feed display area in a user interface. In certain embodiments, the proxy user is a virtual user that shares at least some user attributes with the subject user. In certain embodiments, at least some of the information of the curated user events is obfuscated in the user-specific feed entries.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates how the herein disclosed techniques can be used in a computing environment to curate interaction events from proxy users to generate user-specific collaboration activity feeds for low-activity users.

The block diagram of FIG. 1 illustrates a computing environment comprising a plurality of content objects 106 (e.g., files, folders, etc.) that are accessed by a plurality of users. As shown, the users might be classified as a set of users with history 102 and a set of new users 103. The users with history 102 are characterized as having an active history of interactions with the content objects 106 and/or other users. Such interactions are described as user-content interactions 112 and user-to-user interactions 114, respectively. For example, a first user might invite a second user to collaborate on some task and/or might request to join a group of other users. As another example, a first user might create a document and then share that document with other users for viewing, editing, or commenting by the other users.

A first portion (e.g., user U1, user U2, user U3, etc.) of the users with history 102 might correspond to physical users (e.g., humans), while a second portion (e.g., user V1, user V2, user V3, etc.) of the users with history 102 might correspond to virtual users. Virtual users are created and managed to represent a user of certain characteristics. Use of the virtual users can facilitate certain capabilities of a computing system or environment, such as described herein. The other shown class of users, the new users 103, are characterized as having no or limited interactions with the content objects 106 and/or other users. A user newly onboarded is one example of such a low-activity user. Other low-activity users may not be newly onboarded, but may nevertheless have limited to no activity due to their role or function.

The efficiency, productivity, and creativity of the users with history 102 and/or the new users 103 can be enhanced by a knowledge of such collaboration activities (e.g., user-content interactions 112, user-to-user interactions 114, etc.) as performed by other users. Based on the knowledge of such activities, a particular user might initiate a new collaboration activity (e.g., with a content object, with another user, etc.) that is beneficial to the collaboration activity participants. In many computing environments, indications of such user activity (e.g., user interactions over content objects and/or user interactions with other users) can take the form of a "feed" that offers visibility into certain aspects of other users' interactions. For example, a feed of a particular user might show that several colleagues (e.g., other users in the same department) have been editing a particular presentation over the past several days. However, determining collaboration activity information to deliver to low-activity users (e.g., new users 103) can present challenges. For example, approaches that determine collaboration activity information based on the historical activity (e.g., user-to-user interactions, user-content interactions, etc.) of a subject user will fail when the subject user is a new user.

The herein disclosed techniques address such problems attendant to presenting relevant collaboration activity knowledge to users with little or no historical collaborative activities. An activity history 116 associated with the users with history 102 is tracked by recording instances of event attributes 126 that correspond to user events 120 raised by such users. Various attributes (e.g., content attributes 128) associated with the content objects of the user events 120 are codified in and/or referenced by the activity history 116. As a comparison, either no activity history (e.g., no activity history 118) or only sparsely populated user activity history (e.g., populated less than a threshold) is available for the new users 103. Inasmuch as a history of events are used in generating relevant collaboration activities for a user, some technique is needed to associate a history of events for the new user. One way to associate a history of events for a new user is to identify a proxy user, and use historical events belonging to the proxy user when generating relevant collaboration activities for the new user. The aforementioned threshold can be a threshold based on of a number of events, or a threshold based on a number of days, or a threshold based on a number of unique content objects among the events, etc.

A proxy user selector 142 accesses the activity history 116 and/or a set of active user attributes 122 (e.g., associated with the users with history 102) and/or a set of subject user attributes 136 (e.g., associated with one or more subject users from the new users 103) to select a proxy user for each subject user. For example, and as shown by the set of proxy users 104, user U1 (e.g., a physical user) from the users with history 102 might be selected for a subject user $110_1$ (e.g., user N1) from the new users 103, and user V1 (e.g., a virtual user) from the users with history 102 might be selected for a subject user $110_2$ (e.g., user N2) from the new users 103.

The attributes of the selected proxy user (e.g., selected proxy user attributes 134) and the user events associated with the proxy user (e.g., selected proxy user event attributes 132) are consumed by a subject user event curator 144 to generate a set of curated user events 162. As a result of the foregoing operations, the curated user events 162 collected by the subject user event curator 144 are relevant to the subject user. An event processor 146 generates a set of user-specific feed entries 164 from the event attributes of the curated user events 162. The user-specific feed entries 164 are processed for presentation to the subject user in a user-specific collaboration activity feed.

As shown, for example, the user-specific feed entries 164 might be organized into a user-specific collaboration activity feed $150_{N1}$ that is specific to user N1. Another portion of the user-specific feed entries 164 might be organized into a user-specific collaboration activity feed that is specific to user N2, and so on.

The user-specific collaboration activity feed facilitated by the herein disclosed techniques constitute relevant collaboration activity knowledge that can be efficiently presented to low-activity users, such as new users. As such, application of the techniques disclosed herein facilitate improvements in computer functionality that serve to reduce or eliminate waste of computer processing power. Specifically, strictly as one example, wasteful consumption of computing resources to perform ad hoc and possibly fruitless searching for and/or aimless browsing of content as may be performed by a new user in seeking collaboration opportunities is eliminated.

One embodiment of techniques for curation of collaboration activity for such low-activity users (e.g., new users) is disclosed in further detail as follows.

Figure 2:
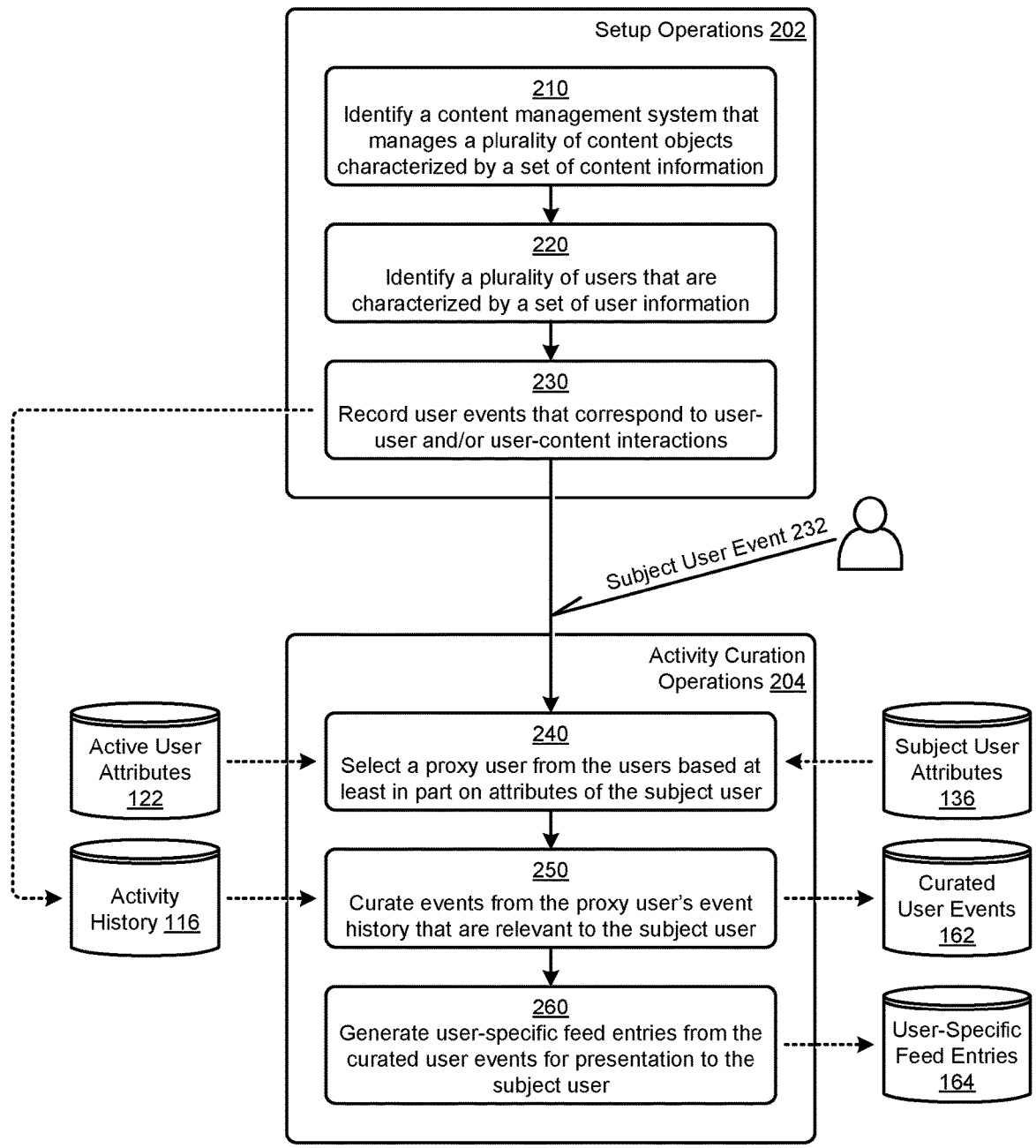
FIG. 2 depicts a collaboration activity curation technique as implemented in systems that curate collaboration activity feed entries from proxy user collaboration activity history, according to an embodiment.

FIG. 2 depicts a collaboration activity curation technique 200 as implemented in systems that curate collaboration activity feed entries from proxy user collaboration activity history. As an option, one or more variations of collaboration activity curation technique 200 or any aspect thereof may be implemented in the context of the architecture and functionality of the embodiments described herein. The collaboration activity curation technique 200 or any aspect thereof may be implemented in any environment.

The collaboration activity curation technique 200 shown in FIG. 2 presents one embodiment of certain steps and/or operations that facilitate curating interaction events from proxy users to generate user-specific collaboration activity feeds for low-activity users. As shown, such steps and/or operations can constitute a set of setup operation 202 and a set of activity curation operations 204.

The setup operation 202 of the collaboration activity curation technique 200 can commence by identifying a content management system that manages a plurality of content objects that are characterized by a set of content information (step 210). For example, the content management system might be a cloud-based content management platform that stores and provides access to content objects over a distributed computing and storage system. The system might track various metadata associated with the content objects that describe certain attributes of the content objects. A plurality of users that are characterized by a set of user information are also identified (step 220). The users might subscribe to the aforementioned content management system to interact with (e.g., create, edit, view, etc.) the content objects as individuals and/or as groups of collaborators. The system might track various user data (e.g., user profiles) that describe certain attributes of the users. User events that correspond to interactions between the users (e.g., user-to-user interactions) and between the users and content objects (e.g., user-content interactions) are recorded at the system (step 230). As illustrated, the user events might be recorded in a store of activity history 116.

The activity curation operations 204 of the collaboration activity curation technique 200 can commence in response to a subject user event 232. For example, a subject user event might correspond to the event of onboarding a new employee. As another example, a subject user event might correspond to the event of a subject user changing his or her role or department such that the user has limited or no collaboration activity. In response to the subject user event 232, a proxy user is selected from the users based at least in part on various attributes of the subject users (step 240). As can be observed, a set of subject user attributes 136 corresponding to the subject user and/or corresponding to a set of active user attributes 122 (e.g., which user attributes correspond to users that do have collaboration activity history 116) might be consulted (e.g., compared) to identify the proxy user. User events associated with the proxy user are curated into a set of user events that are relevant to the subject user (step 250). As an example, the activity history 116 can be accessed to select user events that are associated with the proxy user to generate a set of curated user events 162. User-specific feed entries are generated from the curated user events for presentation to the subject user (step 260). Specifically, the user-specific feed entries 164 might be generated from the curated user events 162 for presentation to the subject user in a user-specific collaboration activity feed.

One embodiment of a system for implementing the collaboration activity curation technique 200 and/or other herein disclosed techniques is disclosed as follows.

Figure 3A:
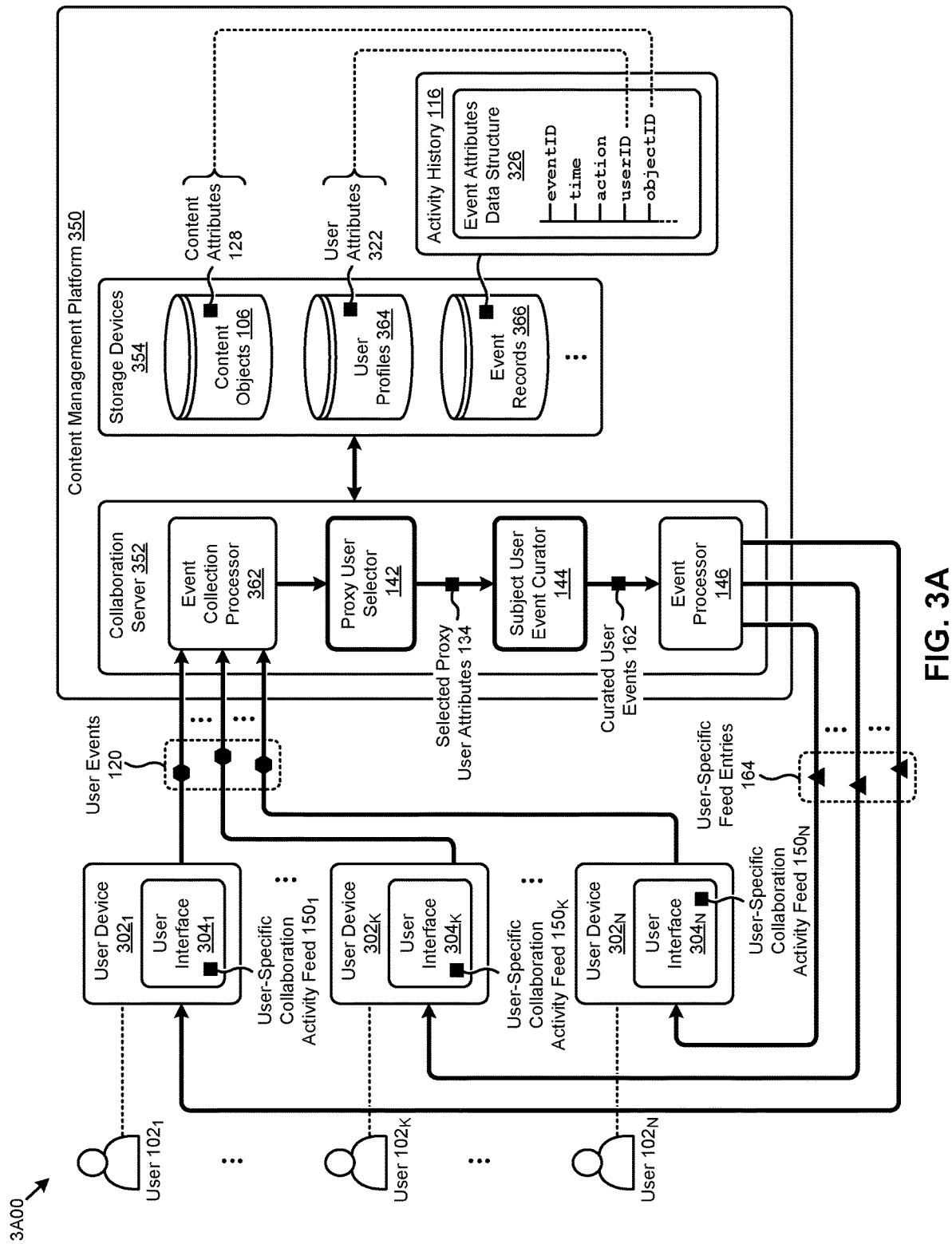
FIG. 3A depicts a computing system for curating collaboration activity feed entries from proxy user collaboration activity history, according to some embodiments.

FIG. 3A depicts a computing system 3A00 for curating collaboration activity feed entries from proxy user collaboration activity history. As an option, one or more variations of computing system 3A00 or any aspect thereof may be implemented in the context of the architecture and functionality of the embodiments described herein. The computing system 3A00 or any aspect thereof may be implemented in any environment.

FIG. 3A illustrates one aspect pertaining to curating interaction events from proxy users to generate user-specific collaboration activity feeds for low-activity users. Specifically, the figure is being presented to show one embodiment of certain representative components, data structures, and associated data flows that describe how the herein disclosed techniques might be implemented in a modern computing system. The components, data structures, and data flows shown in FIG. 3A present one partitioning and associated data manipulation approach. The specific example shown is purely exemplary, and other subsystems, data structures, and/or partitioning are reasonable.

As shown, the computing system 3A00 comprises an instance of the proxy user selector 142, the subject user event curator 144, and the event processor 146 earlier described operating at an instance of a collaboration server 352 in a content management platform 350. An event collection processor 362 is also shown as operating at the collaboration server 352. A plurality of instances of the foregoing components might operate at a plurality of instances of the collaboration server 352 in the content management platform 350 and/or any portion of computing system 3A00. Such instances can access a set of storage devices 354 that store various information that facilitates operation of the computing system 3A00 and/or implementation of the herein disclosed techniques. For example, the collaboration server 352 might facilitate access to shared content in content objects 106 by a plurality of users (e.g., user $102_1$, . . . , user $102_K$, . . . , user $102_N$) from a respective set of user devices (e.g., user device $302_1$, . . . , user device $302_K$, . . . , user device $302_N$). The objects (e.g., files, folders, etc.) in content objects 106 are characterized at least in part by a set of content attributes 128 (e.g., metadata) stored at the storage devices 354. Furthermore, the users are characterized at least in part by a set of user attributes 322 stored in a set of user profiles 364 at storage devices 354.

In some cases, the users can interact with user interfaces or application workspaces (e.g., user interface $304_1$, . . . , user interface $304_K$, . . . , user interface $304_N$) at the user devices to invoke the user events 120 at the computing system 3A00. The event collection processor 362 at the collaboration server 352 can detect the user events 120 invoked by the plurality of users. The event collection processor 362 can codify certain event attributes pertaining to the user events 120 to be stored in a set of event records 366 within storage devices 354. In some cases, event collection processor 362 will access the user attributes 322 (e.g., user identifiers, etc.) stored in user profiles 364 and/or the content attributes 128 (e.g., content object identifiers, etc.) stored in content objects 106, to facilitate populating the event records 366.

The event records 366 and/or any other data described herein can be organized and/or stored using various techniques. For example, the event records 366 might be organized and/or stored in a tabular structure (e.g., relational database table) that has rows that are organized so as to relate various event objects that pertain to a particular user event. As another example, the information might be organized and/or stored in a programming code object that has instances corresponding to a particular user event and properties corresponding to the various attributes (e.g., permissions attributes, event object attributes, etc.) associated with the event. In some cases, any of the foregoing data structures might be logically represented in a graph that comprises nodes (e.g., event objects) and edges (e.g., pairwise relationships between the event objects).

As depicted in FIG. 3A, event records 366 can store an activity history 116 of at least some of the users (e.g., the active users) in sets of event attributes. In this case, as depicted by the event attributes data structure 326, an event data record (e.g., table row or object instance or graph relationship) for a particular user event might describe an event identifier (e.g., stored in an "eventID" field), an event timestamp (e.g., stored in a "time" field), a description of the interaction type (e.g., stored in an "action" field), an identifier associated with the user (e.g., stored in a "userID" field), an identifier associated with the object accessed by the user (e.g., stored in an "objectID" field), and/or other event attributes. The event records 366 and/or other information at the content management platform 350 are accessed to generate instances of user-specific feed entries 164 that are delivered to user-specific collaboration activity feeds (e.g., user-specific collaboration activity feed $150_1$, . . . , user-specific collaboration activity feed $150_K$, . . . , user-specific collaboration activity feed $150_N$) of the respective users.

When the subject user is a low-activity user (e.g., new user), the herein disclosed techniques are applied to generate and deliver the user-specific feed entries to the subject user. In this case, the proxy user selector 142 at the collaboration server 352 accesses the content attributes 128 and/or user attributes 322 (e.g., of the subject user and active users) to select a proxy user for the subject user. The user attributes of the selected proxy user (e.g., selected proxy user attributes 134) are used by the subject user event curator 144 to generate a set of curated user events 162. For example, the subject user event curator 144 will traverse the event records 366 to identify user events that are associated with the proxy user based at least in part on the selected proxy user attributes 134. Since the proxy user is selected based at least in part on the user attributes of the proxy user as compared to the user attributes of the subject user, the curated user events 162 identified by the subject user event curator 144 are deemed relevant to the subject user. An event processor 146 generates instances of the user-specific feed entries 164 for the subject user based at least in part on the event attributes of the curated user events 162. These feed entries are processed for presentation to the subject user in a user-specific collaboration activity feed that is displayed, for example, in a user interface of a user device corresponding to the subject user.

The user-specific feed entries presented to the subject user can comprise a human-readable description of the event (e.g., "Sally edited file plan.pptx on Apr. 29, 2018"). In some cases, a display order and/or visual elements (e.g., styling, icons, avatars, animated GIFs, etc.) may be applied to the feed entries for presentation. In other cases, some of the information from a user event of a proxy user is not to be displayed to the subject user. In these cases, certain portions of the event description may be obfuscated. For example, the description "A user edited a file similar to userInfo.pdf on May 2, 2018" obfuscates the user name and file name of the underlying user event of the proxy user.

Further details regarding general approaches to displaying event messages are described in U.S. application Ser. No. 16/017,838 titled "PRESENTING COLLABORATION ACTIVITY", filed on Jun. 25, 2018, which is hereby incorporated by reference in its entirety.

The foregoing discussions refers to various data sets (e.g., content attributes, user attributes, etc.) that facilitate the herein disclosed techniques. The structure and use of such data sets are disclosed in further detail as follows.

Figure 3B:
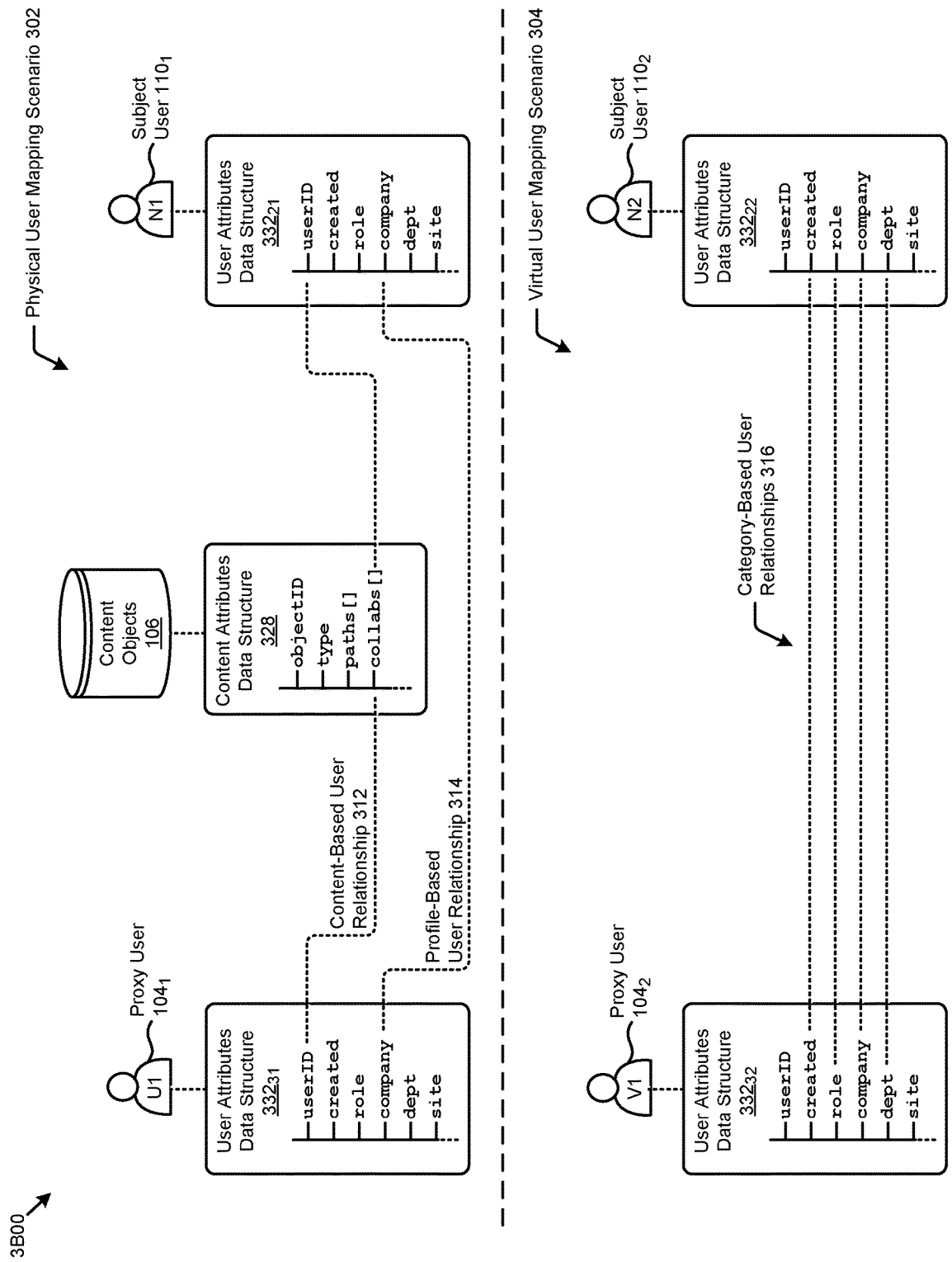
FIG. 3B presents a set of representative data structures for organizing entity attributes in systems that curate the contents of collaboration activity feeds from proxy user collaboration activity history, according to an embodiment.

FIG. 3B presents a set of representative data structures 3B00 for organizing entity attributes in systems that curate the contents of collaboration activity feeds from proxy user collaboration activity history. As an option, one or more variations of representative data structures 3B00 or any aspect thereof may be implemented in the context of the architecture and functionality of the embodiments described herein. The representative data structures 3B00 or any aspect thereof may be implemented in any environment.

FIG. 3B illustrates one aspect pertaining to curating interaction events from proxy users to generate user-specific collaboration activity feeds for low-activity users. Specifically, the figure is being presented to illustrate one embodiment of the data structures of the data sets (e.g., user attributes, content attributes, etc.) that are accessed to facilitate selection of a proxy user to associate with (e.g., map to) a low-activity subject user.

The data structures shown in FIG. 3B include instances of a representative user attributes data structure (e.g., user attributes data structure $332_{21}$, user attributes data structure $332_{22}$, user attributes data structure $332_{31}$, and user attributes data structure $332_{32}$) corresponding to respective subject users or proxy users (e.g., subject user $110_1$, subject user $110_2$, proxy user $104_1$, and proxy user $104_2$). An instance of a representative content attributes data structure (e.g., content attributes data structure 328) corresponding to content objects 106 is also shown. As depicted in the instances of the user attributes data structure, a set of user attributes (e.g., stored in a table row or object instance) for a particular user might describe a user identifier (e.g., stored in an "userID" field), a timestamp corresponding to when the user was created (e.g., stored in a "created" field), a description of user's role (e.g., stored in a "role" field), an identifier for a company associated with the user (e.g., stored in a "company" field), an identifier for a department associated with the user (e.g., stored in a "dept" field), an identifier for a site associated with the user (e.g., stored in a "site" field), and/or other user attributes. The content attributes data structure 328 indicates a set of content attributes (e.g., stored in a table row or object instance) for a particular content object might describe a content object identifier (e.g., stored in an "objectID" field), a description of a content object type (e.g., stored in a "type" field), a list of parent and/or child paths associated with the content object (e.g., stored in a "paths [ ]" object), a list of users permitted to access the content object (e.g., stored in a "collabs [ ]" object), and/or other content attributes.

As can be observed in FIG. 3B, various types of user relationships between the subject users and the proxy users can be identified based at least in part on the data organized according to the aforementioned data structures. Specifically, in a physical user mapping scenario 302, a profile-based user relationship 314 between subject user $110_1$ (e.g., user N1) and proxy user $104_1$ (e.g., user U1) is identified based on the company identifier associated with the users. For example, subject user $110_1$ and proxy user $104_1$ might be employees of the same company. As indicated by a content-based user relationship 312 that connects the "userID" of each user to the "collabs [ ]" object, subject user $110_1$ and proxy user $104_1$ might be related by the fact that they both have access to a particular content object. Furthermore, in a virtual user mapping scenario 304, a set of category-based user relationships 316 between subject user $110_2$ (e.g., user N2) and proxy user $104_2$ (e.g., user V1) is identified based on the "created", "role", "company", and "dept" attributes of the users. The foregoing user relationships are merely examples and other user relationships and/or information may be used by the herein disclosed techniques to select a proxy user for a particular subject user.

The foregoing discussions include techniques for selecting a proxy user to associate with a subject user (e.g., step 240 of FIG. 2), which techniques are further disclosed as follows.

Figure 4:
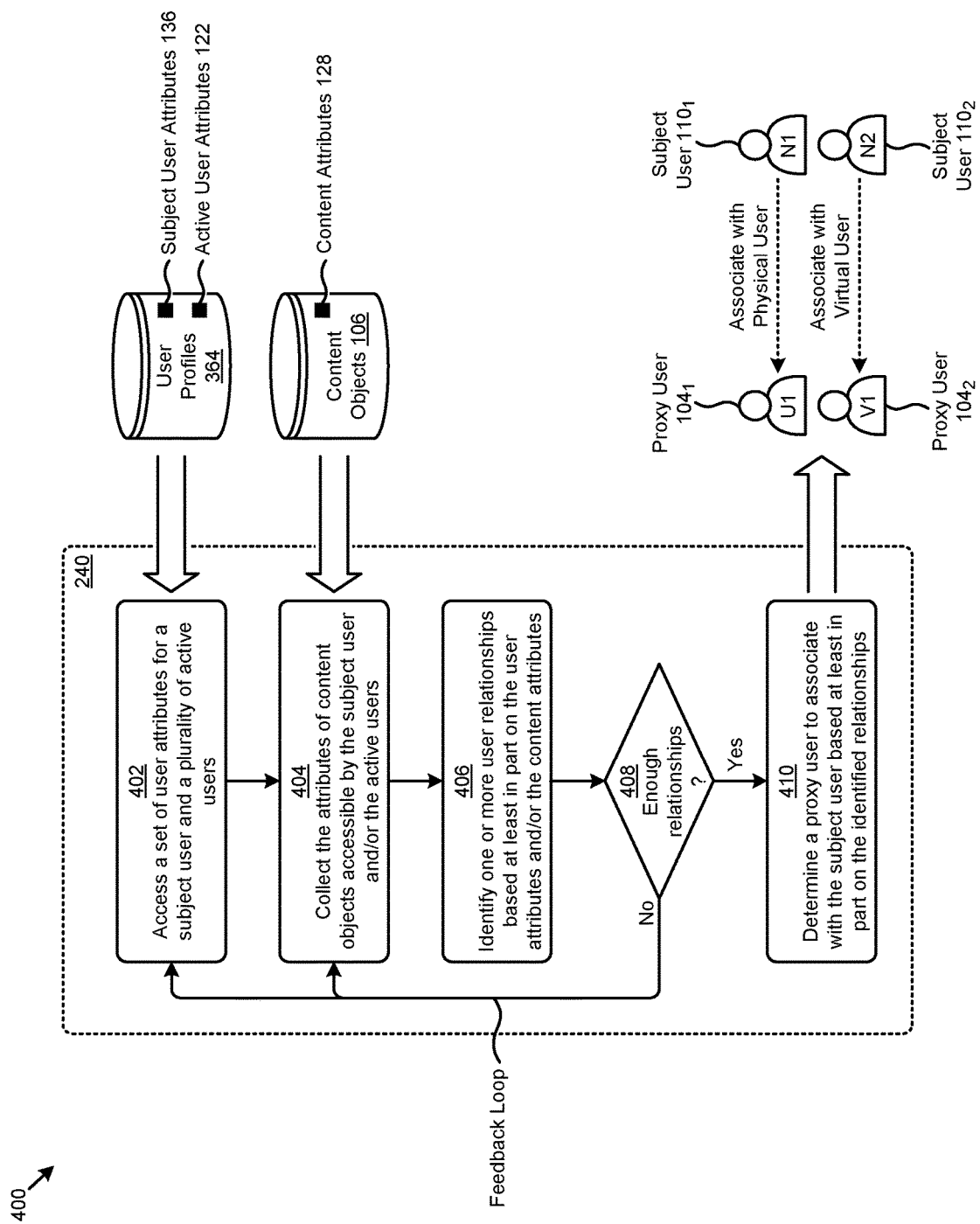
FIG. 4 depicts a proxy user selection technique as implemented in systems that curate collaboration activity from proxy user collaboration activity history, according to an embodiment.

FIG. 4 depicts a proxy user selection technique 400 as implemented in systems that curate collaboration activity from proxy user collaboration activity history. As an option, one or more variations of proxy user selection technique 400 or any aspect thereof may be implemented in the context of the architecture and functionality of the embodiments described herein. The proxy user selection technique 400 or any aspect thereof may be implemented in any environment.

FIG. 4 illustrates one aspect pertaining to curating interaction events from proxy users to generate user-specific collaboration activity feeds for low-activity users. Specifically, the figure is being presented to illustrate one embodiment of certain steps and/or operations for associating a proxy user (e.g., physical user or virtual user) with a low-activity subject user (e.g., new user).

The proxy user selection technique 400 shown in FIG. 4 can commence by accessing a set of user attributes for a subject user and a plurality of active users (step 402). As illustrated, a set of subject user attributes 136 and a set of active user attributes 122 might be access from a store of user profiles 364. The attributes of various content objects accessible by the subject user and/or the active users are collected (step 404). As an example, a portion of the content attributes 128 associated with accessible content objects in content objects 106 might be collected. One or more user relationships between the subject user and the active users are identified based at least in part on the user attributes and/or the content attributes (step 406). In some cases, no user relationships—or only a statistically insufficient number of user relationships—are identified (see "No" path of decision 408), and user attributes of more users and/or more content attributes of more content objects are retrieved.

For example, users and/or content objects at additional levels of separation from the subject user may need to be considered to identify a sufficient number of user relationships. When a sufficient number of user relationships are identified (see "Yes" path of decision 408), a proxy user to associate with the subject user is determined based at least in part on the identified user relationships (step 410). As an example, the user relationships might be ranked and/or scored to facilitate selection of the proxy user with the strongest overall association to the subject user. As earlier described and shown in FIG. 4, a subject user (e.g., subject user $110_1$) can be associated with a physical proxy user (e.g., proxy user $104_1$), or a subject user (e.g., subject user $110_2$) can be associated with a virtual proxy user (e.g., proxy user $104_2$).

The foregoing discussions include techniques for curating proxy user events for a subject user (e.g., step 250 of FIG. 2), which techniques are disclosed in further detail as follows.

Figure 5:
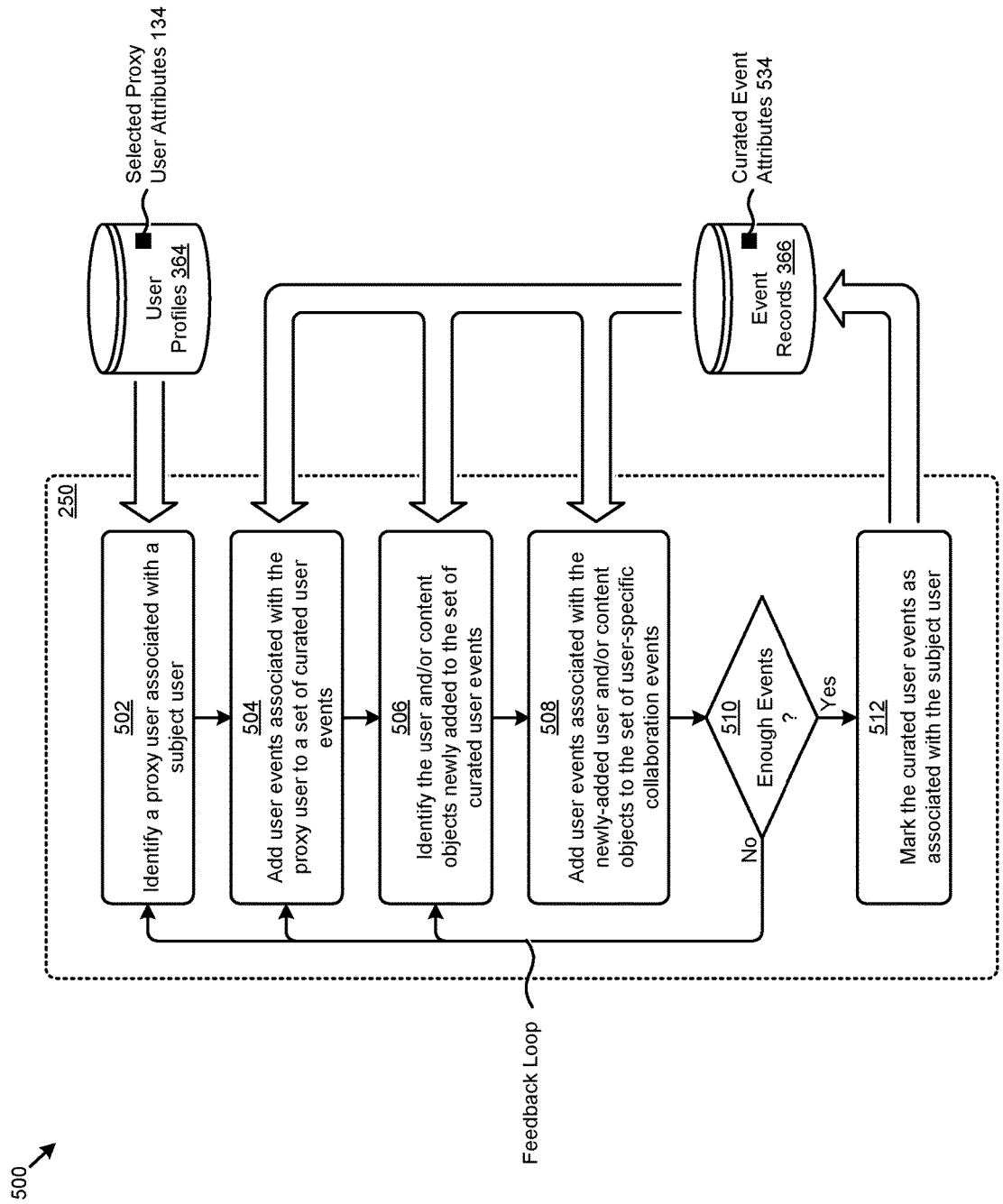
FIG. 5 presents an event curation technique as implemented in systems that facilitate curating collaboration activity feed contents from proxy user collaboration activity history, according to an embodiment.

FIG. 5 presents an event curation technique 500 as implemented in systems that facilitate curating collaboration activity feed contents from proxy user collaboration activity history. As an option, one or more variations of event curation technique 500 or any aspect thereof may be implemented in the context of the architecture and functionality of the embodiments described herein. The event curation technique 500 or any aspect thereof may be implemented in any environment.

FIG. 5 illustrates one aspect pertaining to curating interaction events from proxy users to generate user-specific collaboration activity feeds for low-activity users. Specifically, the figure is being presented to illustrate one embodiment of certain steps and/or operations for curating user events from a proxy user's collaboration activity that can be presented in a collaboration activity feed to a low-activity subject user.

The event curation technique 500 shown in FIG. 5 can commence by identifying a proxy user that is associated with a subject user (step 502). For example, a proxy user selected according to the herein disclosed techniques might be identified by a set of selected proxy user attributes 134 stored in a set of user profiles 364. User events associated with the proxy user are added to a set of curated user events (step 504). As an example, a set of event records 366 might be queried to identify the user events that directly involved the proxy user. The users and/or content objects of the user events in the then-current set of curated user events are identified (step 506).

For example, the attributes (e.g., curated event attributes 534) of the then-current curated events might be consulted to determine any users and/or content objects associated with the events of the proxy user. Any user events that are associated with the identified users and/or content objects are then added to the set of curated user events (step 508). As such, the foregoing operations capture user events that are two levels of separation from the proxy user.

Decision 510 serves to determine if there are enough events to present to the subject user (e.g., by comparison to a threshold value). If more events are needed (see "No" path of decision 510), the feedback loop is taken such that all or portions of the operations of step 502, step 504, step 506 and step 508 are repeated so as to add more user events to the curated user events. In some cases, during processing of step 502, additional proxy users are selected, and events pertaining to the additional proxy users are considered.

In some cases, during processing of step 504, still further additional levels of separation are considered for the proxy user or users that had been selected in step 502. Additionally, it can happen that during processing of step 506, permission settings are encountered such that a candidate event should be filtered out (e.g., should not be curated). As such, when events that pertain to object or objects that are restricted from access by the subject user (e.g., by permissions or filtering policies) those events are removed from consideration. The foregoing permissions can apply to collaboration objects or can apply to any other characteristics of the event.

Further details regarding general approaches to handling permissions are described in U.S. Application Ser. No. 62/723,913 titled "FILTERING COLLABORATION ACTIVITY", filed on Aug. 28, 2018, which is hereby incorporated by reference in its entirety.

Returning to the discussion of decision 510, if there are enough events (see "Yes" path of decision 510), the compiled set of curated user events are marked as being associated with the subject user (step 512). The marked user events can then be used to generate a set of user-specific feed entries for presentation in an activity feed to the subject user (e.g., step 260 of FIG. 2) as disclosed in further detail as follows.

Figure 6A:
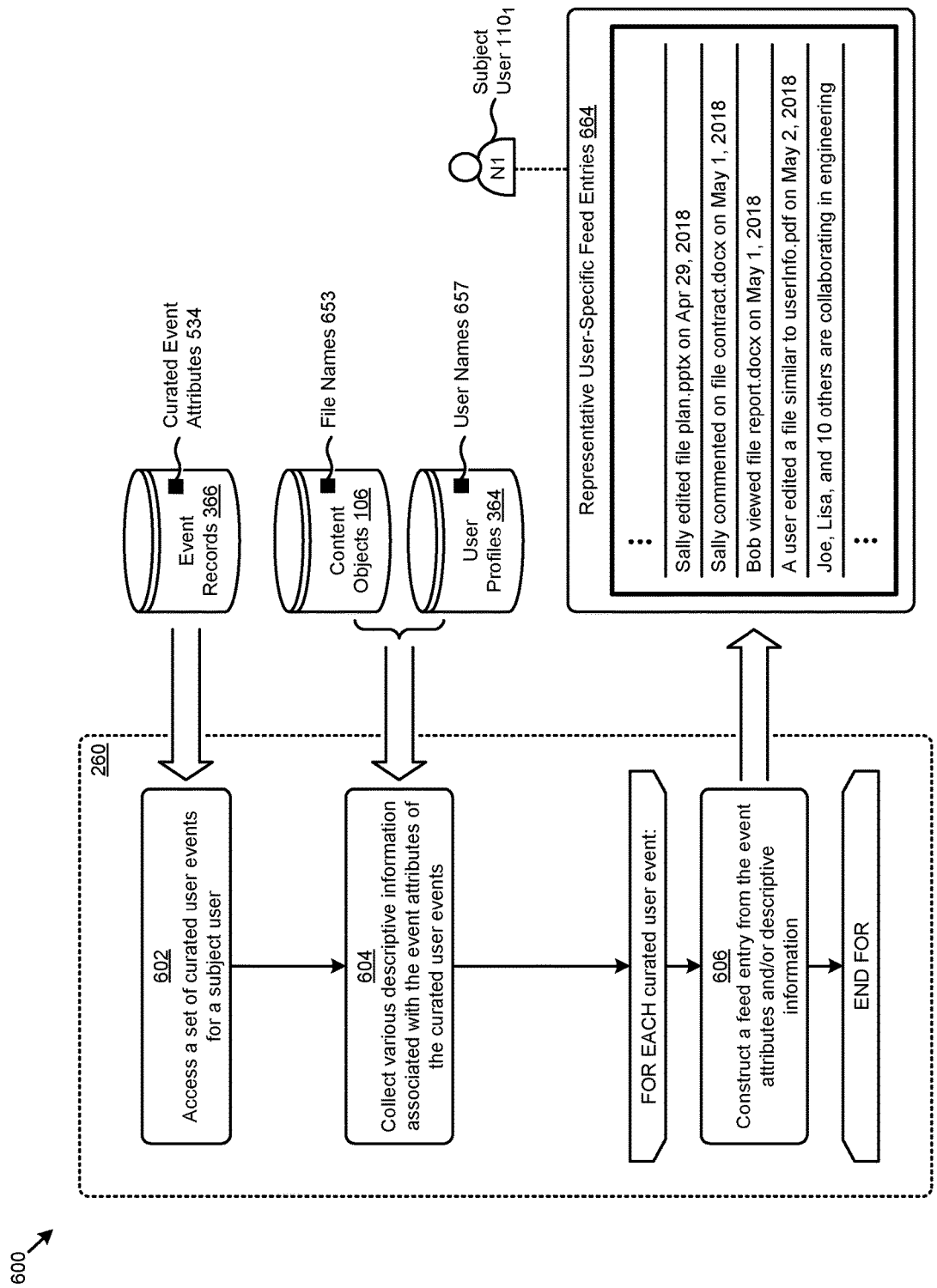
FIG. 6A, FIG. 6B, and FIG. 6C present variations of an activity feed presentation technique as implemented in systems that facilitate curating collaboration activity feed contents from proxy user collaboration activity history, according to an embodiment.
Figure 6B:
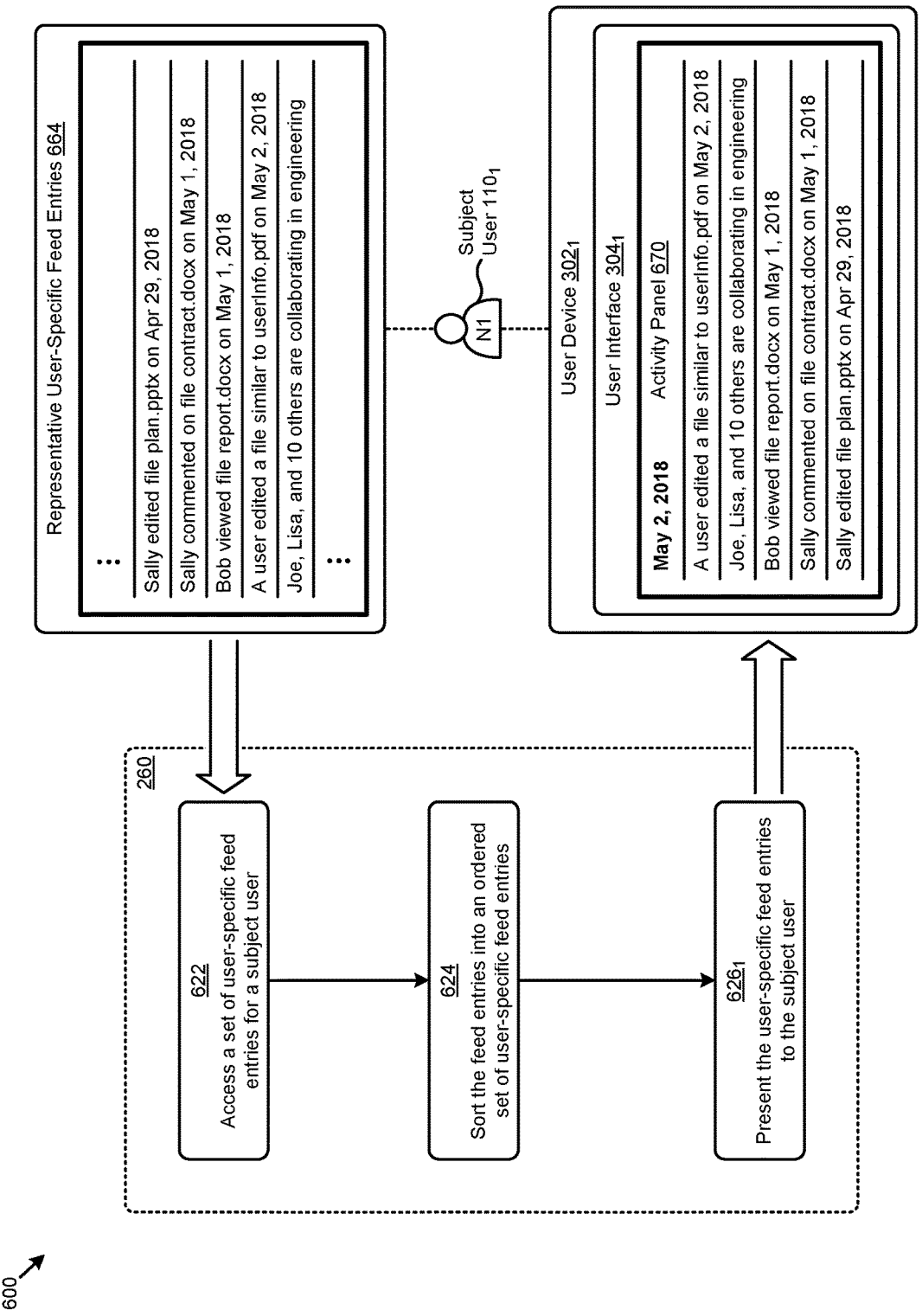
Figure 6C:
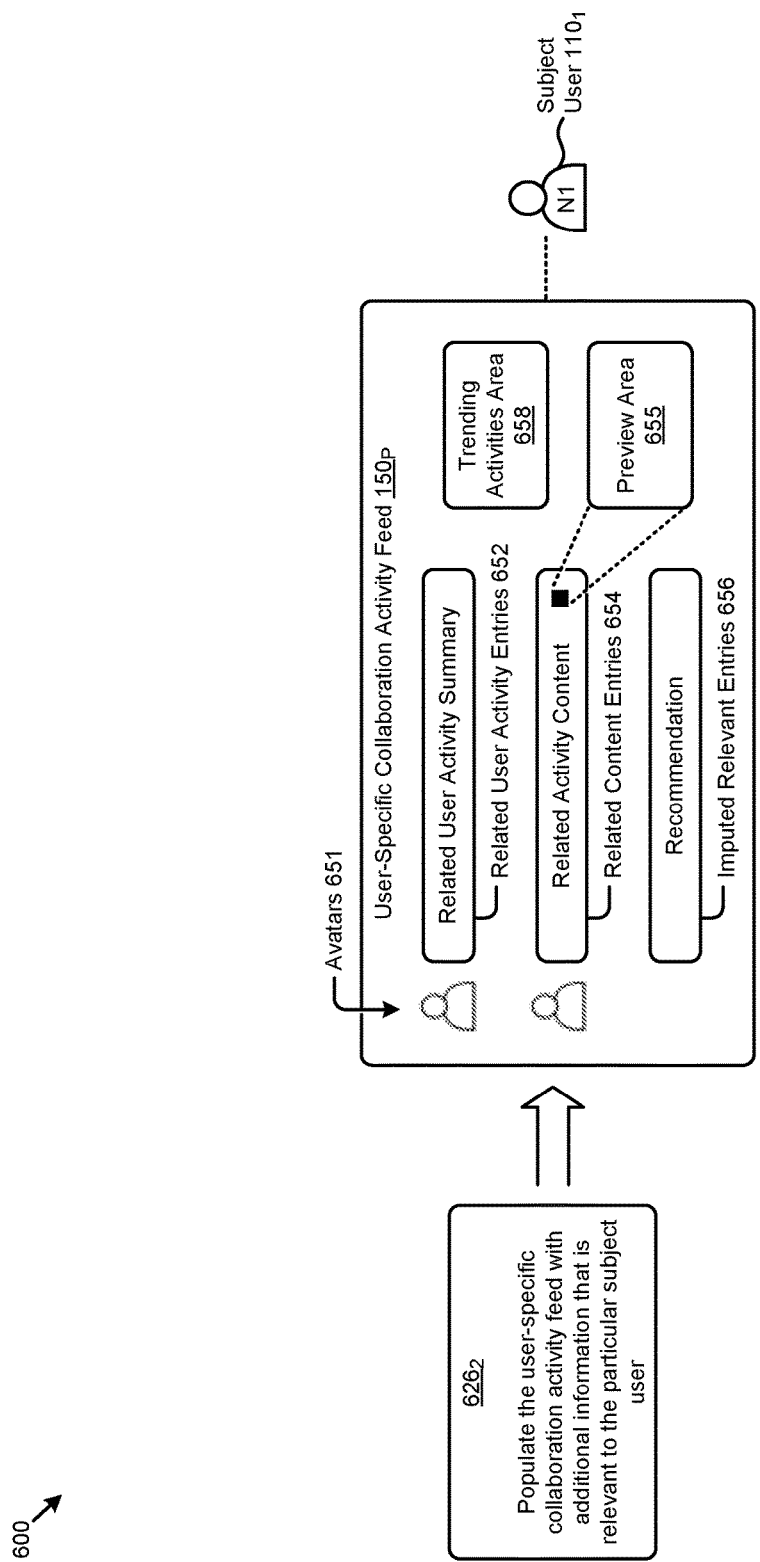

FIG. 6A, FIG. 6B, and FIG. 6C present variations of an activity feed presentation technique 600 as implemented in systems that facilitate curating collaboration activity feed contents from proxy user collaboration activity history. As an option, one or more variations of activity feed presentation technique 600 or any aspect thereof may be implemented in the context of the architecture and functionality of the embodiments described herein. The activity feed presentation technique 600 or any aspect thereof may be implemented in any environment.

The figures are presented to illustrate variations of certain steps and/or operations and/or user interfaces employed when generating human-readable activity feed entries that are presented to a particular subject user.

The portion of the activity feed presentation technique 600 shown in FIG. 6A implements aspects of step 260. The presentation technique commences by accessing a set of curated user events for a subject user (step 602). As illustrated, accessing the curated user events might comprise accessing a set of attributes (e.g., curated event attributes 534) associated with the curated user events that are codified in a store of event records 366. Various descriptive information pertaining to the event attributes (e.g., curated event attributes 534) of the curated user events are collected (step 604). As an example, a set of file names 653 corresponding to any content objects identified in the curated user events might be collected from a storage facility (e.g., content objects 106). Furthermore, a set of user names 657 might be collected from the user profiles 364 of any users associated with the curated user events.

For each user event curated for the subject user, a feed entry is constructed from the event attributes and/or description information associated with the user event (step 606). As illustrated in a set of representative user-specific feed entries 664 for a subject user 110$_1$, the constructed feed entries comprise human-readable messages derived from the underlying user event information. In some cases, certain message construction logic and/or rules (e.g., for determining verb tense, preposition type, preposition placement, date of activity, text formatting, etc.) might be implemented to generate the feed entries.

In other cases, some of the information from a curated user event (e.g., of a proxy user) is not to be displayed to the subject user. In these cases, certain portions of the event description may be obfuscated. For example, the description "A user edited a file similar to userInfo.pdf on May 2, 2018" obfuscates the user name and file name of the underlying user event of the proxy user.

Referring to FIG. 6B, the activity feed presentation technique 600 implements aspects of step 260, and commences upon accessing a set of user-specific feed entries for a subject user (step 622). As illustrated, such feed entries might be the representative user-specific feed entries 664 associated with subject user 110$_1$. The feed entries are organized into an ordered set of user-specific feed entries (step 624). Such organization might include operations pertaining to filtering, sorting, decorating, and/or other operations. For example, the feed entries might be sorted according to one or more sorting rules (e.g., based on the user event timestamp). The ordered user-specific feed entries are then presented to the subject user (step 626$_1$). As can be observed, a certain set of ordered feed entries might be presented to subject user 110$_1$ in an activity panel 670 of a user interface 304$_1$ at a user device 302$_1$ associated with subject user 110$_1$.

As shown in FIG. 6C, one technique for presenting ordered user-specific feed entries (step 6262) includes populating the user-specific collaboration activity feed with additional information that is relevant to the particular subject user. The additional information is rendered using particular screen area organizations and particular screen devices to form the shown user-specific collaboration activity feed 150$_P$. Also as shown, the user-specific collaboration activity feed includes a screen area for presenting related user activity summaries, a screen area for presenting related activity content, a screen area for presenting recommendations, and a screen area for presenting trending activities (e.g., trending activities area 658). In some embodiments, and as shown, the screen area is organized to include a preview area 655. The area for presenting related user activity summaries comprises one or more related user activity entries 652, the area for presenting related activity content comprises one or more related content entries 654, and the area for presenting recommendations comprises one or more imputed relevant entries 656. In some cases, one or more avatars 651 might be presented to indicate a user that is associated with an activity.

Over time, the subject user might generate his or her own history, and such history might be used in determination of another proxy user and/or determination of events to be used in feed generation. As such, as time progresses, and in the course of successive feed generation for the subject user, the same proxy user's activity history or a different proxy user's activity history might be used. Moreover, at some point in time, the subject user might generate enough of his or her own activities such that reliance on the proxy user's activity history become insignificant or nil. In one embodiment, reliance on activity history of a proxy user can be reduced or eliminated when the subject user has sufficient activity history to generate a threshold number of feed entries. For example, when the subject user has a sufficient number of entries in the subject user's corresponding activity history such that, for example, five feed entries can be generated without any reliance on proxy user events, then the proxy user's activity history is no longer used in the generation of user-specific feed entries.

Additional Embodiments of the Disclosure

Additional Practical Application Examples

Figure 7:
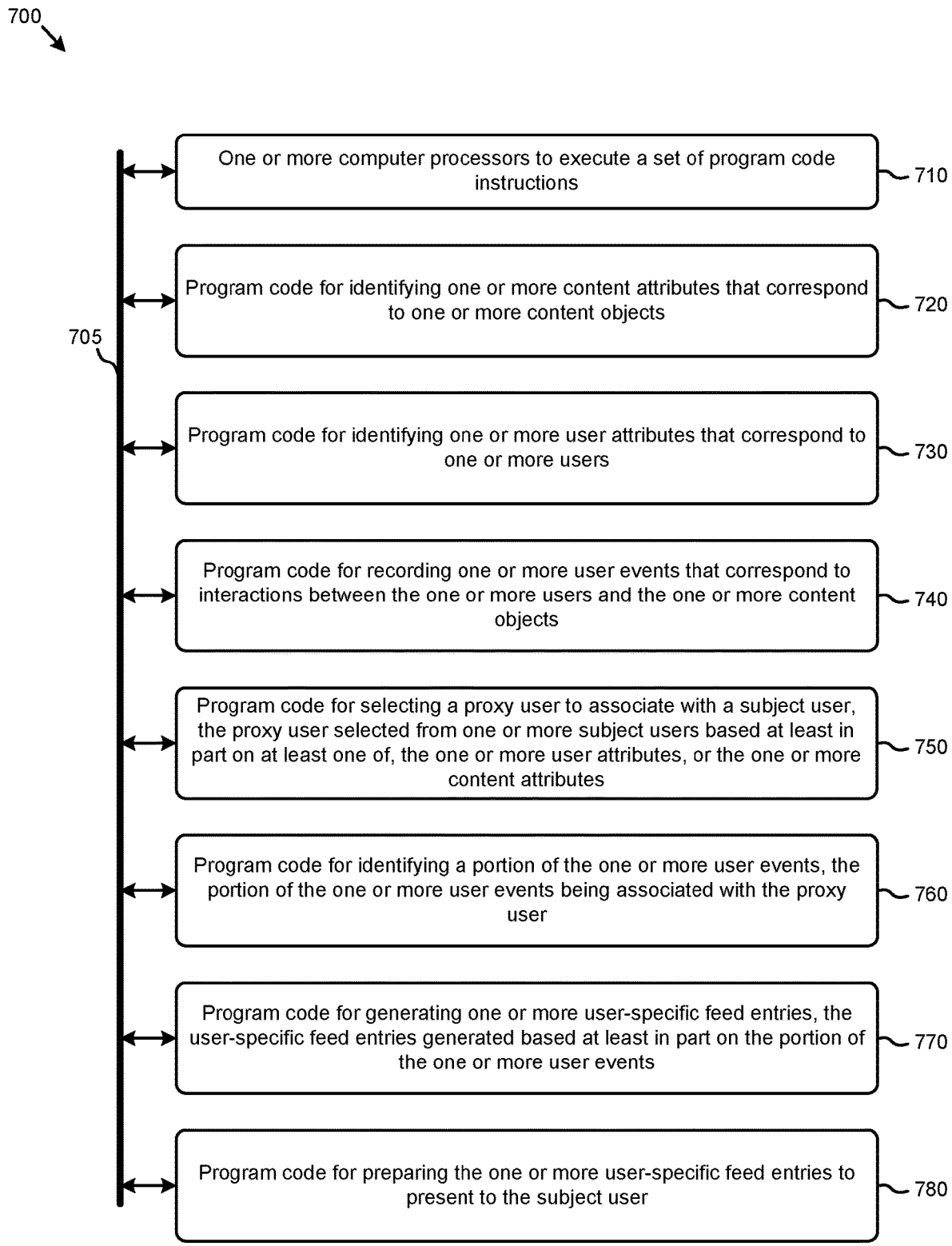
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually and/or as combined, serve to form improved technological processes that address presenting relevant collaboration activity knowledge to users with little or no historical collaborative activities. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising one or more computer processors to execute a set of program code instructions (module 710) and modules for accessing memory to hold program code instructions to perform: identifying one or more content attributes that correspond to one or more content objects (module 720); identifying one or more user attributes that correspond to one or more users (module 730); recording one or more user events that correspond to interactions between the one or more users and the one or more content objects (module 740); selecting a proxy user to associate with a subject user, the proxy user selected from the one or more subject users based at least in part on at least one of, one or more of the one or more user attributes, or one or more of the one or more content attributes (module 750); identifying a portion of the one or more user events, the portion of the one or more user events being associated with the proxy user (module 760); generating one or more user-specific feed entries, the user-specific feed entries generated based at least in part on the portion of the one or more user events (module 770); and preparing the one or more user-specific feed entries to present to the subject user (module 780).

Variations of the foregoing may include more or fewer of the shown modules. Certain variations may perform more or fewer (or different) steps and/or certain variations may use data elements in more or in fewer (or different) operations.

System Architecture Overview

Additional System Architecture Examples

Figure 8A:
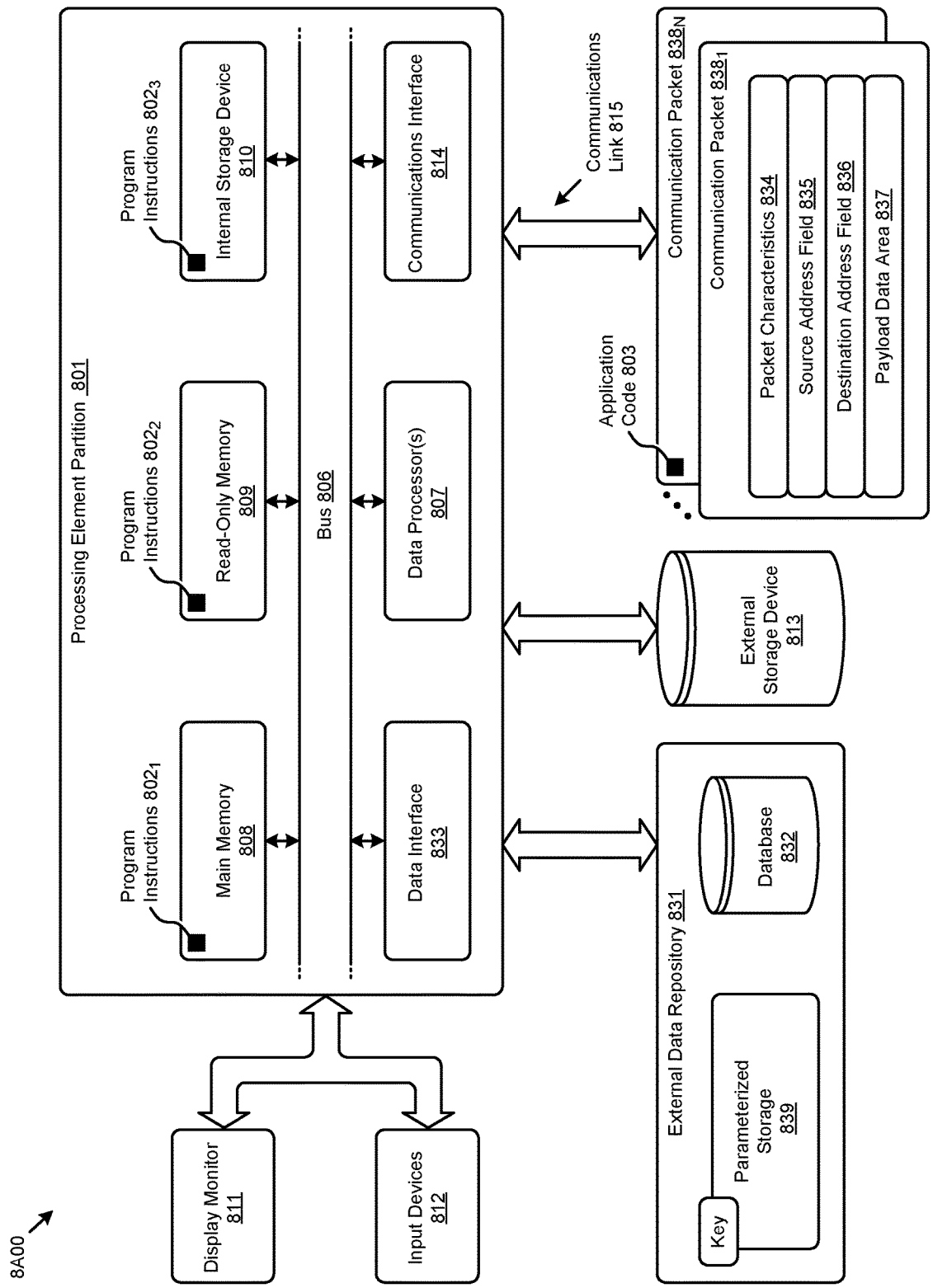
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. Computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communication packet $838_1$, communication packet $838_N$) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of a computer system 8A00. According to certain embodiments of the disclosure, two or more instances of computer system 8A00 coupled by a communications link 815 (e.g., LAN, public switched telephone network, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to curating collaboration activity feeds from proxy user collaboration activity history. A module may include one or more state machines and/or combinational logic used to implement or facilitate the operational and/or performance characteristics pertaining to curating collaboration activity feeds from proxy user activity history.

Various implementations of database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of curating collaboration activity feeds from proxy user collaboration activity history). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to curating collaboration activity feeds from proxy user collaboration activity history, and/or for improving the way data is manipulated when performing computerized operations pertaining to curating interaction events from proxy users to generate user-specific collaboration activity feeds for low-activity users.

Figure 8B:
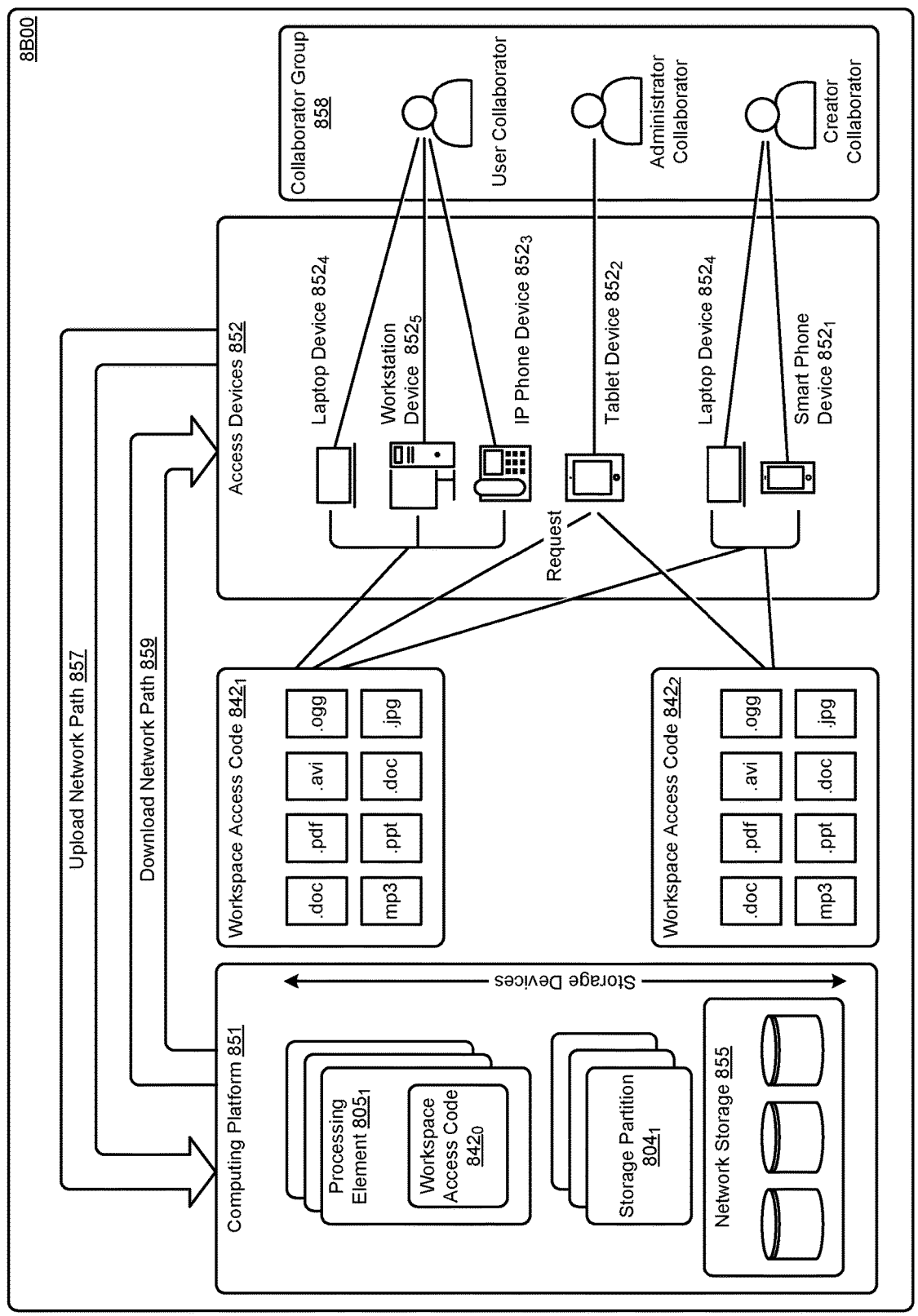

FIG. 8B depicts a block diagram of an instance of a cloud-based environment 8B00. Such a cloud-based environment supports access to workspaces through the execution of workspace access code (e.g., workspace access code $842_0$, workspace access code $842_1$, and workspace access code $842_2$). Workspace access code can be executed on any of access devices 852 (e.g., laptop device $852_4$, workstation device $852_5$, IP phone device $852_3$, tablet device $852_2$, smart phone device $852_1$, etc.). A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element $805_1$). The workspace access code can interface with storage devices such as networked storage 855. Storage of workspaces and/or any constituent files or objects, and/or any other code or scripts or data can be stored in any one or more storage partitions (e.g., storage partition $804_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for selecting collaboration activity for a subject user in a cloud-based content management platform, the method performed by at least one computer and comprising:
    identifying one or more content attributes that correspond to one or more content objects;
    identifying one or more user attributes that correspond to one or more users;
    recording one or more user events that correspond to interactions between the one or more users and the one or more content objects;
    upon determining that the subject user has an activity history that is populated less than a threshold, then constructing a proxy user to associate with the subject user, the proxy user being constructed based at least in part on at least one of, the one or more user attributes of at least one of the one or more users, or one or more of the one or more content attributes, or a combination thereof;
    identifying a portion of the one or more user events, the portion of the one or more user events being associated with the proxy user;
    generating one or more user-specific entries to present to the subject user of the cloud-based content management platform, the one or more user-specific entries generated based at least in part on the portion of the one or more user events; and
    preparing the one or more user-specific entries to present to the subject user.

2. The method of claim 1, further comprising:
    modifying at least some of the one or more user-specific entries to present as user-specific feed entries in a user interface.

3. The method of claim 2, further comprising:
    obfuscating at least one of the one or more user-specific feed entries.

4. The method of claim 2, wherein the proxy user is a physical user or a virtual user.

5. The method of claim 2, wherein the proxy user is selected based at least in part on one or more user relationships between the one or more user attributes or the one or more content attributes.

6. The method of claim 5, wherein the one or more user relationships comprise at least one of, one or more content-based user relationships, one or more profile-based user relationships, or category-based user relationships.

7. The method of claim 1, wherein the one or more user events correspond to at least one of, one or more user-to-user interactions, or one or more user-content interactions.

8. The method of claim 1, wherein the subject user is at least one of, a new user, or a low-activity user that has a corresponding activity history that is populated less than at least one of, a threshold number of events over the one or more content objects, or a threshold number of days of interaction over the one or more content objects, or a threshold number of unique interaction events over the one or more content objects.

9. The method of claim 1, wherein the one or more content objects are managed by a content management platform.

10. A non-transitory computer readable medium, the non-transitory computer readable medium having stored thereon a sequence of instructions which, when stored in memory and executed by one or more processors causes the one or more processors to perform a set of acts for selecting collaboration activity for a subject user in a cloud-based content management platform, the acts comprising:
identifying one or more content attributes that correspond to one or more content objects;
identifying one or more user attributes that correspond to one or more users;
recording one or more user events that correspond to interactions between the one or more users and the one or more content objects;
upon determining that the subject user has an activity history that is populated less than a threshold, then constructing a proxy user to associate with the subject user, the proxy user being constructed based at least in part on at least one of, the one or more user attributes of at least one of the one or more users, or one or more of the one or more content attributes, or a combination thereof;
identifying a portion of the one or more user events, the portion of the one or more user events being associated with the proxy user;
generating one or more user-specific entries to present to the subject user of the cloud-based content management platform, the one or more user-specific entries generated based at least in part on the portion of the one or more user events; and
preparing the one or more user-specific entries to present to the subject user.

11. The non-transitory computer readable medium of claim 10, further comprising instructions which, when stored in memory and executed by the one or more processors causes the one or more processors to perform acts of:
modifying at least some of the one or more user-specific entries to present as user-specific feed entries in a user interface.

12. The non-transitory computer readable medium of claim 11, further comprising instructions which, when stored in memory and executed by the one or more processors causes the one or more processors to perform acts of:
obfuscating at least one of the one or more user-specific feed entries.

13. The non-transitory computer readable medium of claim 11, wherein the proxy user is a physical user or a virtual user.

14. The non-transitory computer readable medium of claim 11, wherein the proxy user is selected based at least in part on one or more user relationships between the one or more user attributes or the one or more content attributes.

15. The non-transitory computer readable medium of claim 14, wherein the one or more user relationships comprise at least one of, one or more content-based user relationships, one or more profile-based user relationships, or category-based user relationships.

16. The non-transitory computer readable medium of claim 10, wherein the one or more user events correspond to at least one of, one or more user-to-user interactions, or one or more user-content interactions.

17. The non-transitory computer readable medium of claim 10, wherein the subject user is at least one of, a new user, or a low-activity user that has a corresponding activity history that is populated less than at least one of, a threshold number of events over the one or more content objects, or a threshold number of days of interaction over the one or more content objects, or a threshold number of unique interaction events over the one or more content objects.

18. The non-transitory computer readable medium of claim 10, wherein the one or more content objects are managed by a content management platform.

19. A system for selecting collaboration activity for a subject user in a cloud-based content management platform, the system performed by at least one computer and comprising:
a storage medium having stored thereon a sequence of instructions; and
one or more processors that execute the instructions to cause the one or more processors to perform a set of acts, the acts comprising,
identifying one or more content attributes that correspond to one or more content objects;
identifying one or more user attributes that correspond to one or more users;
recording one or more user events that correspond to interactions between the one or more users and the one or more content objects;
upon determining that the subject user has an activity history that is populated less than a threshold, then constructing a proxy user to associate with the subject user, the proxy user being constructed based at least in part on at least one of, the one or more user attributes of at least one of the one or more users, or one or more of the one or more content attributes, or a combination thereof;
identifying a portion of the one or more user events, the portion of the one or more user events being associated with the proxy user;
generating one or more user-specific entries to present to the subject user of the cloud-based content management platform, the one or more user-specific entries generated based at least in part on the portion of the one or more user events; and
preparing the one or more user-specific entries to present to the subject user.

20. The system of claim 19, wherein the subject user is at least one of, a new user, or a low-activity user.

* * * * *